Nov. 3, 1925.

R. A. WEAVER ET AL 1,559,591

METHOD OF AND APPARATUS FOR LOADING AND UNLOADING ENAMELING FURNACES

Filed Oct. 31, 1923    5 Sheets-Sheet 1

INVENTORS:
ROBERT A. WEAVER
ARTHUR STOCKSTROM
BY
ATTORNEY.

Nov. 3, 1925.  
R. A. WEAVER ET AL  
1,559,591  
METHOD OF AND APPARATUS FOR LOADING AND UNLOADING ENAMELING FURNACES  
Filed Oct. 31, 1923  
5 Sheets-Sheet 2

INVENTORS:  
ROBERT A. WEAVER  
ARTHUR STOCKSTROM  
BY  
ATTORNEY.

INVENTORS:
ROBERT A. WEAVER
ARTHUR STOCKSTROM
BY
Frank L. Sissions
ATTORNEY

INVENTORS
ROBERT A. WEAVER
ARTHUR STOCKSTROM
BY
ATTORNEY.

Patented Nov. 3, 1925.

1,559,591

UNITED STATES PATENT OFFICE.

ROBERT A. WEAVER, OF LAKEWOOD, OHIO, AND ARTHUR STOCKSTROM, OF ST. LOUIS, MISSOURI.

METHOD OF AND APPARATUS FOR LOADING AND UNLOADING ENAMELING FURNACES.

Application filed October 31, 1923. Serial No. 672.025.

*To all whom it may concern:*

Be it known that we, ROBERT A. WEAVER and ARTHUR STOCKSTROM, citizens of the United States, residing, respectively, at Lakewood, Cuyahoga County, Ohio, and St. Louis, St. Louis County, Missouri, have invented certain new and useful Improvements in Methods of and Apparatus for Loading and Unloading Enameling Furnaces, of which the following is a specification.

Among the objects of our invention is the provision of apparatus for loading and unloading enameling furnaces by which these operations may be done quickly and thereby conserve the heat of the furnace and reduce the cost of fuel as well as increase the productive capacity of the furnace. Another object of our invention is to provide a method of operating the loading and unloading apparatus which will result in these operations being performed quicker than by heretofore known methods, thereby saving time and fuel and resulting in lower costs for labor and fuel, better working conditions for the men employed for doing the work and a better product.

In the manufacture of enameled products, whether of sheet or cast metal, the fusing of the enamel takes place at high temperatures in especially designed furnaces. The metal objects to be enameled are supported in the furnace on upright pins, known as "burning points," which are in turn supported upon or are integral parts of bars or racks made of non-oxidizing metal of high melting point which are introduced into and withdrawn from the furnace by means of a so called "charging fork."

Previous to our invention it has been customary for the entire load of the furnace comprising a complete "charge" together with the metal supporting racks and pins to be deposited in or withdrawn from the furnace at one time by means of this so called "charging fork." The cold, unbaked work has been loaded upon the hot racks and pins which are carried on the fork, and the hot, enameled work, just out of the furnace, has been unloaded from them by hand, either by using asbestos gloves or by the use of iron tongs, each piece of work being handled individually.

When the hot work is withdrawn from the furnace the supporting racks and pins, which usually constitute a greater mass of metal than the work, withdraw a large amount of heat which is rapidly dissipated in the atmosphere outside of the furnace. The longer the time required to unload and reload the fork, the greater is the loss of heat. In fact, it is sometimes impossible for the workmen to approach near enough to the work and the supporting racks and pins which have just been withdrawn from the furnace to remove the work until the hot parts have cooled considerably and much heat has been lost. In any event the loading and unloading operations are arduous and difficult. It is obvious that all of the heat which is dissipated by the work and its supports while they are out of the furnace is lost and that heat equivalent to that lost must be re-supplied to the furnace for each and every charge that is put into it. Anything which will reduce the time that the supporting racks and pins are out of the furnace will increase the economy of operation and any mechanical apparatus or quicker methods which may be employed for loading and unloading the furnace will relieve the arduousness of the task of the men employed about the furnace.

For charging the furnace our invention contemplates the loading of the cold, unbaked work upon a transfer table the work-supporting portion of which extends outwardly in overhanging or cantilever fashion from the truck frame which carries the table, moving the transfer table with its load of unbaked work into the path of the charging fork, lifting the work off from the transfer table by means of the charging fork on to the racks which are carried by the fork, withdrawing the transfer table out of the path of the fork, moving the loaded fork into the furnace, lowering the fork to deposit the supporting racks with the unbaked work in the furnace and withdrawing the fork from the furnace.

When the work has been in the furnace a sufficient time for the enamel to be properly baked the fork is again moved into the furnace, the supporting racks with the hot, finished work on them are lifted off from their supports in the furnace and withdrawn with the fork. Preferably another transfer table similar to the one used in loading the fork is now brought into the path of the fork, under the work and the hot, finished work is transferred from the supporting racks and pins to this second transfer table by lowering the fork. The table with its load is then removed out of the path of the fork.

This second transfer table may be called an "unloading" table to distinguish it from the first transfer table which may be called a "loading" table. The loading table which has been loaded with cold, unbaked work during the period that the charge just referred to has been in the furnace, is now moved into position with its load over the hot racks and pins on the charging fork and the new unbaked load is picked up on the pins by the charging fork, the loading table is withdrawn out of the path of the fork and the latter is again caused to enter the furnace and deposit the fresh charge therein. This cycle of operations is repeated as frequently as is required, time being allowed only for the work in the furnace to be heated so that the enamel will be properly baked. There is thus no delay in the loading and unloading operations and the heavy metallic parts which constitute the work-supporting racks and pins are out of the furnace only a few seconds at a time.

On account of the saving of heat to the furnace and the reduction of the length of the periods when the furnace is empty between charges, our invention has increased the output of enameling furnaces from fifty to a hundred percent over the output produced by the former known methods of and apparatus for charging enameling furnaces.

In order that our invention may be properly understood we have illustrated the apparatus in the accompanying drawings in which—

Referring to the drawings, A is a well known type of enameling furnace and B is a charging fork supported upon suitable supports for movements into and out of the furnace to carry a load into or withdraw it from the furnace, A. C and D are load transfer tables which are supported upon wheels, 1, adapted to run upon rails, E, running transversely across the front of the furnace and across the path of movement of the fork, B. F and G are stacks of baked and unbaked articles, respectively, such as table tops which, for convenience are shown adjacent to the sides of the furnace. It is obvious that these articles may be handled or stacked in any convenient manner or place other than as shown in the drawings.

Figure 1:
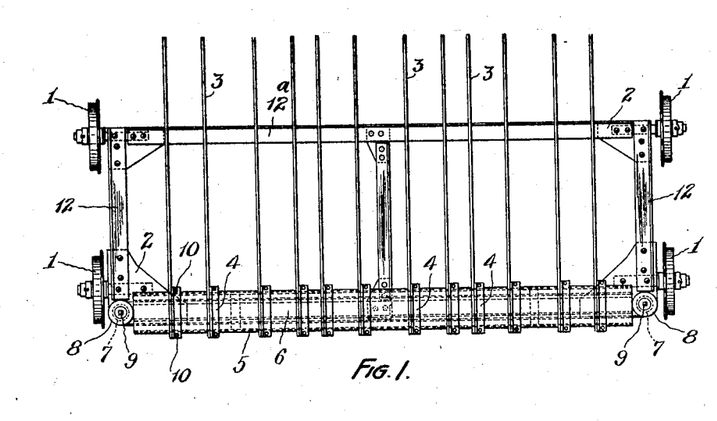
Fig. 1 is a plan view of the transfer truck.
Figure 2:
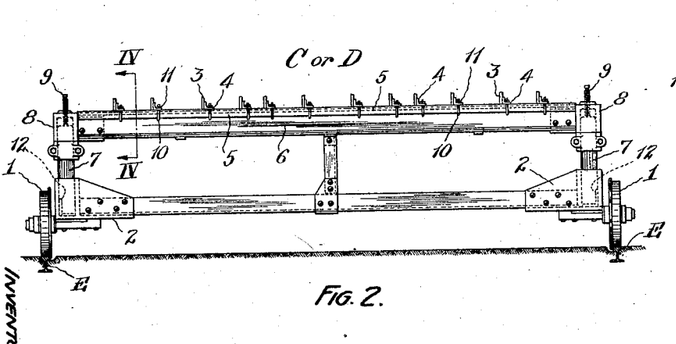
Fig. 2 is a rear elevation of the truck shown in Fig. 1.
Figure 3:
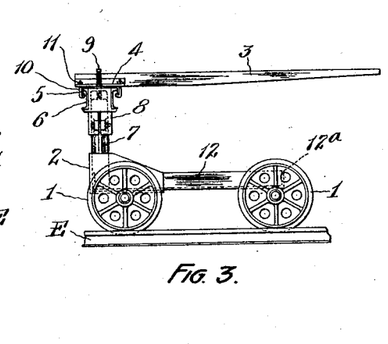
Fig. 3 is an end elevation of the truck shown in Figs. 1 and 2.
Figure 4:
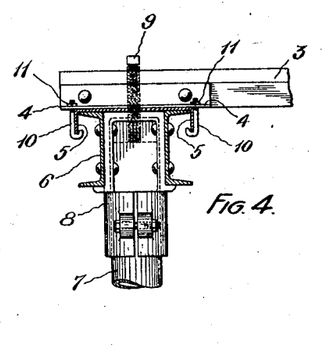
Fig. 4 is an enlarged fragmentary section on line IV—IV of Fig. 2.
Figures 5, 6:
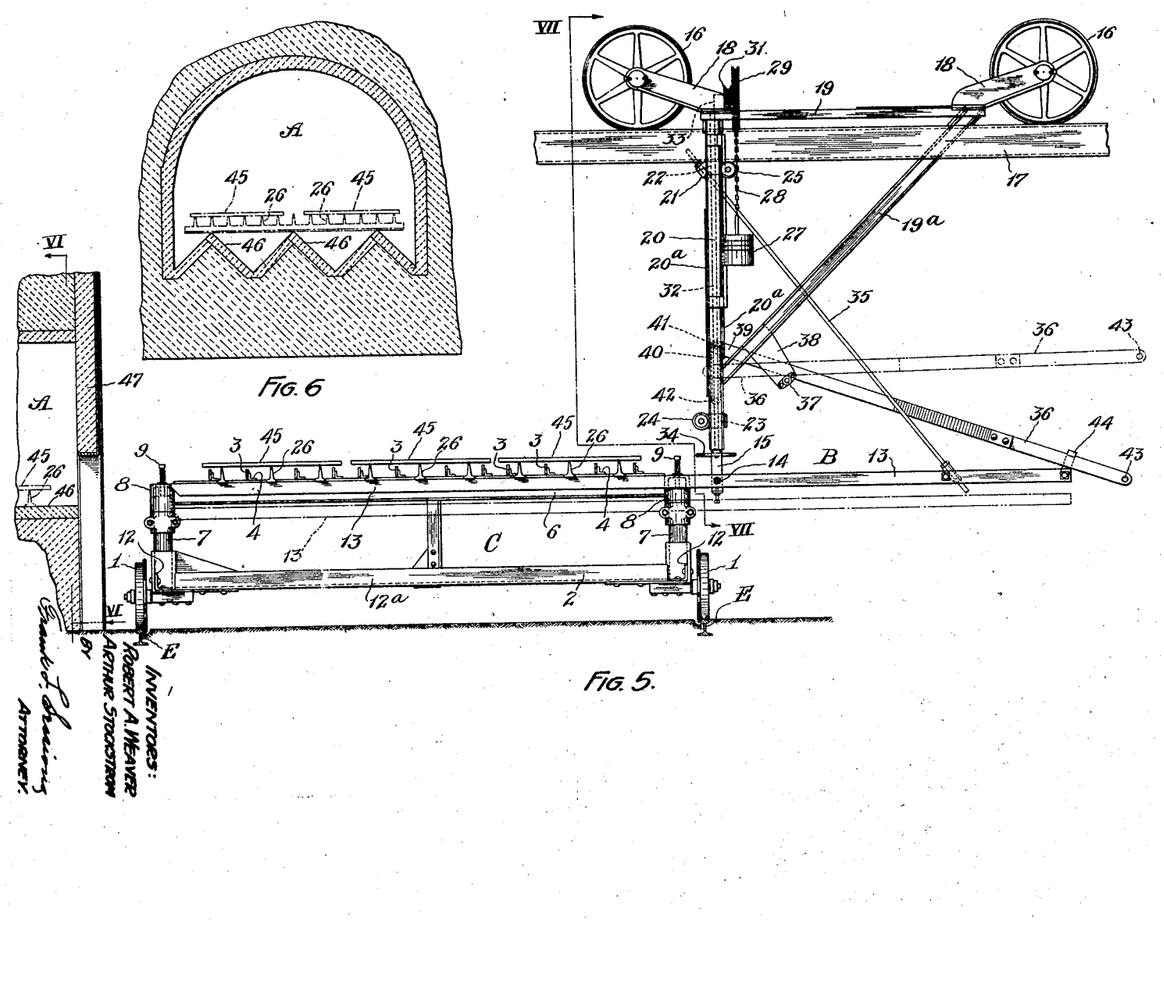
Fig. 5 is a side elevation of the charging fork and a front elevation of the transfer trucks in their positions before the furnace, a fragmentary section of which is shown.
Fig. 6 is a section of the furnace on line VI—VI of Fig. 5.
Figure 7:
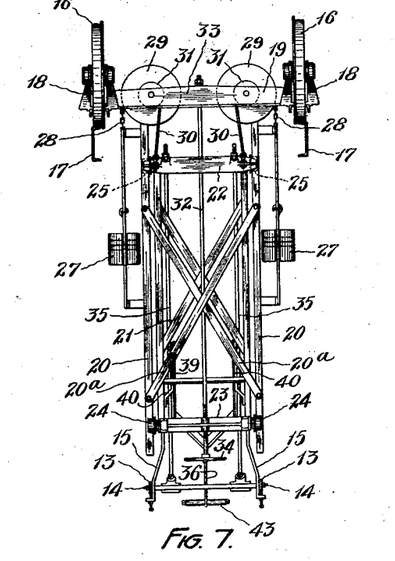
Fig. 7, sheet 3, is a view taken on line VII—VII of Fig. 5.
Figure 8:
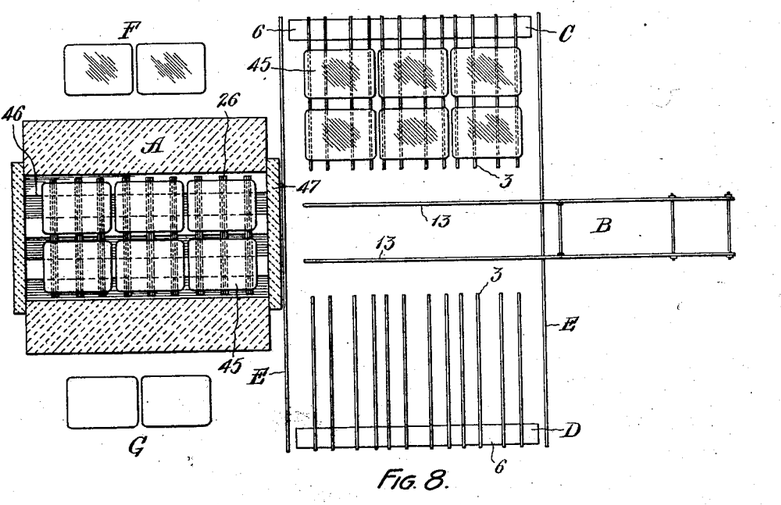
Fig. 8 is a diagrammatic plan view of the apparatus employed in my invention in their respective positions just after the articles which have been baked have been withdrawn from the furnace and transferred from the fork to the unloading table and unbaked articles have been put into the furnace.
Figure 9:
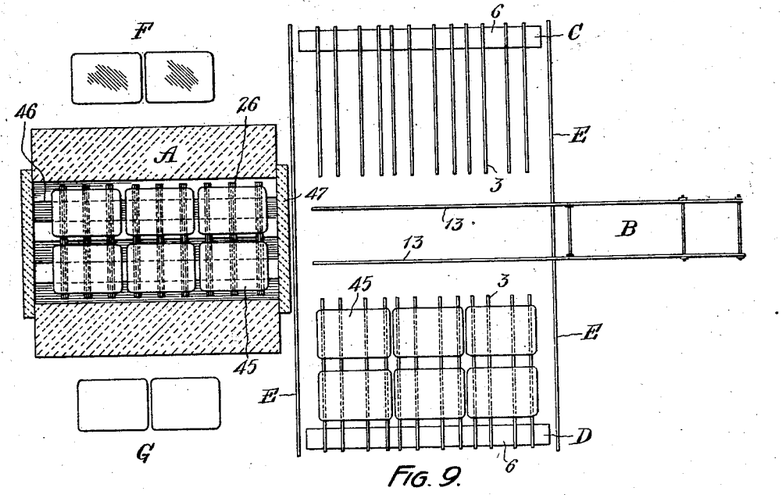
Fig. 9 is a view similar to Fig. 8 except that the baked articles have been unloaded from the unloading table and unbaked articles have been placed on the loading table.
Figure 10:
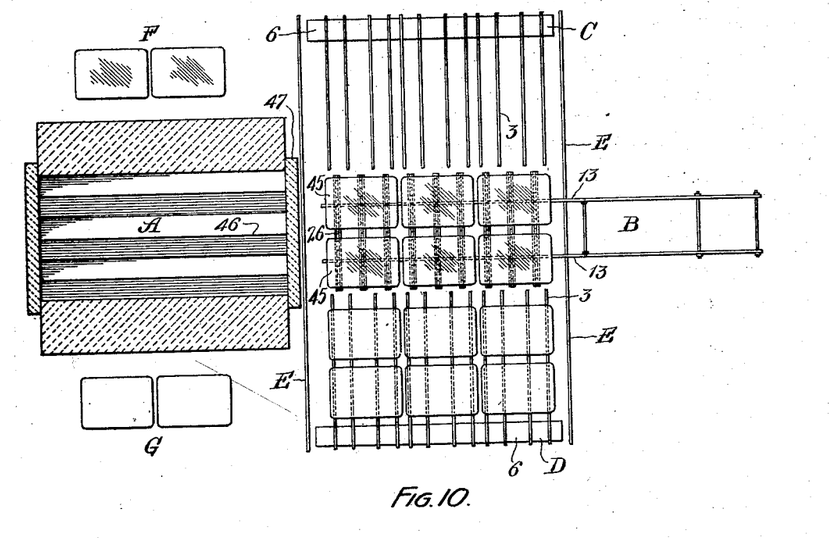
Fig. 10 is a view similar to Fig. 9 except the furnace has been opened and the baked articles have just been withdrawn by the fork.
Figure 11:
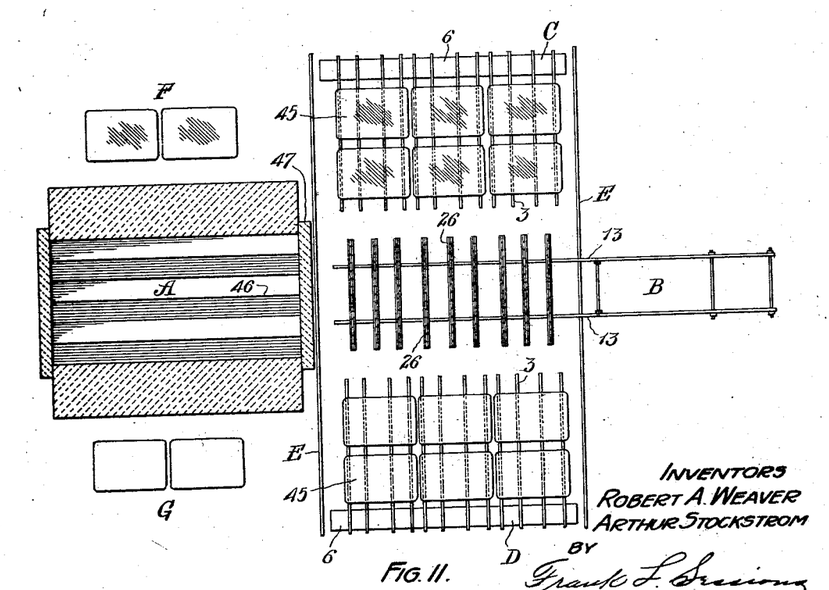
Fig. 11 is a view similar to Fig. 10 except that the unloading table has been run under the fork, the fork has been lowered and the baked articles have been transferred to the unloading table which has been moved out of the path of the fork.
Figure 12:
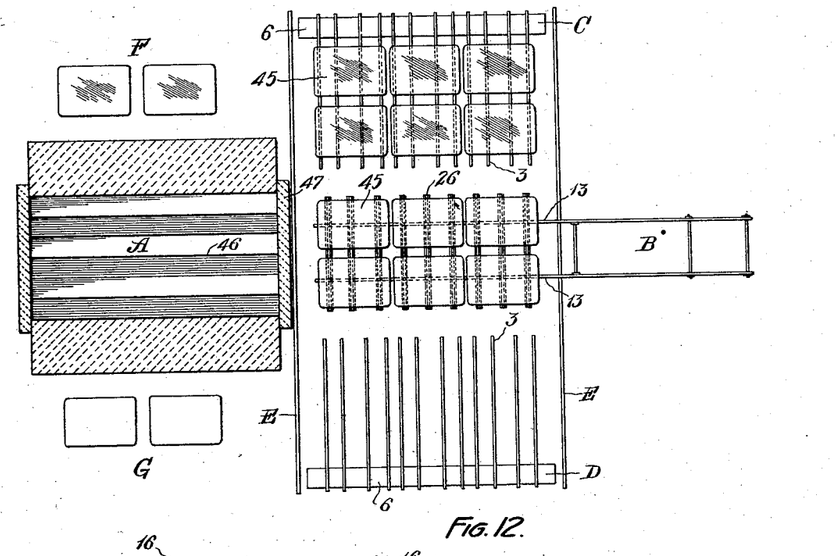
Fig. 12 is similar to Fig. 11 except that the unbaked load has been transferred from the loading table to the fork and is ready to be pushed into the furnace.

The loading and unloading tables which may be exactly alike, are shown in detail in Figs. 1, 2, 3, and 4 of sheet 1, and Fig. 5 of sheet 2. The wheels, 1, are rotatable upon trunnions which are fixed to the table supporting frame, 2. The work-supporting top of the table preferably consists of a series of spaced-apart, parallel, metal bars, 3, each of which has riveted to it or formed integrally with it, at one end, a projecting foot flange shown at 4, Fig. 4, sheet 1. These foot flanges, 4, are secured to downwardly projecting flanges, 5, of a built up channel girder, 6, which extends transversely across the frame, 2, and is supported thereon by means of upright posts, 7. The ends of channel girder, 6, are provided with downwardly presented sockets in end pieces, 8, and adjusting set screws, 9, are provided in the end pieces, 8, for adjusting the height of the top of the table. The set screws, 9, are threaded into apertures in the end pieces, 8, and the ends of the set screws are supported upon the tops of posts, 7. It will be understood that the adjustment of the height of the table top does not have to be frequently made but that when it is once suitably set for the height of the charging fork and supporting racks it does not have to be reset. Hook-bolts, 10, are employed to secure the foot flanges, 4, of the bars, 3, to the channel girder, 6. It will be seen that the spacing of the bars, 3, can be readily varied to suit the requirements of the work or the spacing of the supporting racks by loosening the nuts, 11, of the bolts, 10, shifting the bars to the desired locations and then again tightening the nuts, 11. The bars, 3, being secured at one end to the supporting truck frame, constitute an overhanging or cantilever table top for supporting the work above the charging fork.

The frame, 2, includes side members, 12, which extend forward and are connected by a transverse bar, 12ª.

The forward wheels, 1, are supported upon trunnions at the junction of side members, 12, and cross members, 12ª. The wheel-base of the trucks which carry the table top, 3, will be seen to extend well out under the table top so that the center of gravity of the table with its supported load of work is well within the supporting base afforded by the four truck wheels, 1.

The charging fork, B, which we prefer to employ consists of a pair of bars or fork-sides, 13, which are secured at 14 to the vertical members, 15, of a vertically movable carriage which is suspended from a frame which is supported on truck wheels, 16. It will be observed that the fork sides, 13, extend outwardly from their supports, in overhanging or cantilever fashion. Wheels, 16, are supported upon and adapted to run upon overhead rails, 17. The wheels, 16, are carried upon journal pins which are supported by bearing brackets, 18, of a suitable truck frame, 19, from which the frame which carries the charging fork-sides, 13, is suspended. Descending downwardly from the frame, 19, are vertical members, 20, and brace members, 20ª, which are rigidly connected to the frame, 19, and are rigidly connected together. Vertical members, 20, form a guide for the vertically movable carriage, 21, composed of vertical members, 15, and transverse members, 22 and 23.

The carriage, 21, is provided with flanged, trunnioned rollers, 24, at its lower end and similar rollers, 25, at its upper end, the rollers, 24 and 25 bearing upon opposite sides of the vertical member, 20, to resist the moment of the fork-sides, 13, and the load which may be carried by them and to guide the carriage in its vertical movements. The weight of the carriage, 21, together with the weight of the fork and of the supporting racks and pins, 26, is balanced to the desired extent by counterweights, 27, which are suspended by flexible chains or ropes, 28, which are wound upon drums, 29, the carriage, 21, being hung upon flexible ropes, 30 which are wound upon preferably, smaller diameter drums, 31. A rod, 32, supported at its upper end upon transverse members, 33, of the frame, 19, extends downward through an aperture in cross bar, 23, of the carriage, 21, and carries a threaded, hand-wheel nut, 34, which may be set to limit the downward travel of the carriage, 21, in an obvious manner.

Brace rods, 35, connect the top of carriage, 21, with the rear portions of fork sides, 13, so that the members, 13, 35 and the vertical members, 15, of the carriage, 21, form a pair of rigid triangular frames.

A forked lever, 36, is provided for raising and lowering the charging fork. Lever, 36, is pivoted at 37 to a bracket, 38, which is carried by the brace member, 19ª, of the overhead frame, 19. The forked end, 39, of lever, 36, is connected to the carriage, 21, by means of a connecting link, 40, shown in dotted lines in Fig. 5. The lever ends, 39, are pivoted to links, 40, as shown at 41 and links, 40, are pivoted to the carriage, 21, as shown at 42. Suitable handles, 43, are provided at the outer end of lever, 36, for raising and lowering the charging fork. A bent hook, 44, is provided upon a cross bar which connects the rear ends of the fork sides, 13, and the lever, 36, may be engaged under this hook to hold the fork in its elevated position.

In Fig. 5 the unloading table, C, is shown in position with its top bars, 3, under the work, 45, which is shown as being supported by the racks and pins, 26, which in turn are supported upon the side-bars, 13, of the charging fork, B. It will be observed that the work-supporting members which, as shown in the drawings, are the racks and pins, 26, are spaced apart, longitudinally of the fork, to leave unobstructed, transverse spaces between them to provide free passage of the bars, 3, of the top of the transfer table. As the table is moved into the path of the charging fork the bars, 3, enter these unobstructed spaces between the vertically projecting members, 26, and above the fork sides, 13, of the charging fork. The charging fork is shown in full lines in its elevated position and it will be noted that the work, 45, clears the bars, 3, of the unloading table, C. In the movement of the table C, into the path of the fork, B, the bars, 3, have been caused to pass under the work, 45, above the bars, 13, and between the work supporting members, 26. It will be seen that with reference to the charging fork, the transfer table shown in the drawings moves transversely. In Fig. 5 the lever, 36, and the fork-sides, 13, are shown in two positions, the full lines showing the positions of these parts when the fork is elevated and the dotted lines showing their positions when the fork is lowered.

Fig. 6 shows a cross section of the enameling furnace, A, with the work, 45, supported upon "burning" points which are parts of T bars or racks, 26, which rest upon suitable supporting portions, 46, of the furnace.

To transfer the work, 45, shown in Fig. 5 from the racks and pins, 26, to the bars, 3, the lever, 36, is disengaged from hook, 44, and the fork sides, 13, are lowered until the weight of the work, 45, which constitutes the load upon the racks and pins, 26, is transferred to the bars, 3, and the racks and pins, 26, are then lowered sufficiently to permit the work to clear the tops of the pins. The unloading table with the work, 45, supported upon it may now be withdrawn out of and transversely to the path of the fork without touching either the fork, racks and pins or the work.

Fig. 5 may also be used to illustrate the transfer of work from the loading table to the charging fork. For the purposes of this illustration it should be considered that the fork with its fork-sides lowered and supporting the work-carrying members, 26, in the lowered position has been placed directly in line with the path of movement of the transfer table; that the transfer table has been brought into position directly over the work-carrying members; and that the fork has been lifted so that the burning points of the work-carrying members, 26, have raised the work, 45, off from the bars, 3. To place the work in the furnace the loading transfer table is first withdrawn from the path of the fork and then the fork is pushed into the furnace, the fork is lowered to transfer the racks and pins with the work supported on them to the furnace and the fork is withdrawn.

The charging fork is preferably supported upon the frame which is carried by the truck wheels, 16, which roll upon the overhead track, 17, but it will be understood that any other form of fork support such, for instance, as the known form of charging fork truck which rolls upon the floor or upon floor tracks, may be used.

It will also be understood that the transfer tables may be suspended from overhead traveling supports instead of being carried by floor trucks, if desired. Regardless of the type of traveling supports used for the charging fork and transfer tables it will be observed that the fork extends outwardly in cantilever fashion from its support, and that the transfer table extends outwardly in cantilever fashion from its support but in a different plane from that of the charging fork. This permits the unobstructed movement of the transfer table into the path of the fork above the fork-sides.

The vertically extending work-supports, 26, carried by the fork support the work high enough above the top of the fork to permit the transfer table to enter the space between the work and the fork for the purpose of unloading the fork and the fork has sufficient range of vertical movement to be lowered to permit the transfer table to bring the work into position above the tops of the work-supports, 26, for the purpose of loading the fork.

The work-supporting portions, 46, of the furnace are shown in Figs. 5 and 6. In the drawings the "burning" points and racks are shown as composed of T bars, the pin portions being formed integrally with the bars. This is a well known form of support for work in enameling furnaces. It will be understood that the door, 47, of the furnace, A, should be closed at all times excepting when the fork is in the furnace if heat is to be conserved to the greatest possible extent.

Having thus described our invention we claim:

1. In apparatus for loading and unloading enameling furnaces, the combination of a charging fork adapted to be moved into and out of the furnace to load and unload the furnace, and a transfer table adapted to be loaded with the work to be deposited in the furnace, said transfer table being adapted to be moved transversely across the path of movement of said charging fork, said charging fork being adapted to carry suitable racks for supporting the work in the furnace, and said transfer table being adapted to support the load directly over said racks carried by said charging fork, said charging fork being adapted to be raised and to thereby lift the work from said transfer table to said racks on said charging fork, and said transfer table being adapted to be removed out of its position in the path of the charging fork.

2. In apparatus for loading and unloading enameling furnaces, the combination of a charging fork adapted to be moved into and out of the furnace longitudinally thereof, removable, work-carrying members supported on said fork adapted to support the work in vertically spaced-apart relation to said fork, a transfer table adapted to be moved transversely across the path of movement of the charging fork in front of the furnace, said transfer table being adapted to support the work directly over said work-carrying members on said charging fork, said charging fork being adapted to be raised to cause said work-carrying members to thereby lift the work from said transfer table and said transfer table being then adapted to be moved out of its position in the path of movement of the charging fork.

3. In apparatus for loading and unloading enameling furnaces, the combination of a charging fork having forwardly extending fork-sides adapted to be moved into and out of the furnace to load and unload the furnace, a traveling support for said fork, removable, work-carrying means supported on said fork adapted to support the work in vertically spaced-apart relation to said fork, a transfer table adapted to be moved into and out of the path of movement of said fork and to support the work in overhanging relation to said work-carrying means, a traveling support for said transfer table, and means for raising said fork-sides to cause said work-carrying means to lift the work from said transfer table.

4. In apparatus for loading and unloading enameling furnaces, the combination of a charging fork having forwardly extending fork-sides adapted to be moved into and out of the furnace to load and unload the furnace, a traveling support for said fork, a plurality of horizontally spaced-apart work-carrying racks removably supported on said fork adapted to support the work in vertically spaced-apart relation to said fork, a transfer table adapted to be moved into and out of the path of movement of said fork, and to support the work in overhanging relation to said work-carrying racks, a traveling support for said transfer table and means for lowering said fork-sides to transfer the work from said work-carrying racks to said table.

5. In apparatus for loading and unloading enameling furnaces, a charging-fork having forwardly extending fork-sides, work-supports loosely supported on said fork-sides, said work-supports having upwardly extending portions spaced-apart longitudinally of the fork-sides for supporting the work in vertically spaced-apart relation to said fork-sides, means for raising and lowering said fork-sides; said charging-fork being mounted upon a traveling support movable toward and away from the furnace to cause said fork-sides to be moved into and out of said furnace, longitudinally thereof, and a transfer table adapted to be moved transversely into and out of the path of movement of said charging-fork, a traveling support for said transfer table, said transfer table having spaced-apart, overhanging, work-supporting members adapted to enter the spaces between said upwardly extending portions of said work supports, and between the work and said fork-sides.

6. In apparatus for loading and unloading enameling furnaces, the combination with the furnace of a charging fork, means for raising and lowering said charging fork, means for supporting work on said charging fork in vertically spaced apart relation thereto, and a transfer table having an overhanging, work-supporting portion adapted to enter the space between said charging fork and said work.

7. In apparatus for loading and unloading enameling furnaces, a charging fork; spaced-apart, vertically extending work-supporting members on said fork adapted to support the work thereon in vertically spaced-apart relation thereto; and a transfer table having a work supporting portion adapted to enter the space between said work-supporting members between said work and said fork.

8. In apparatus of the class described, a charging fork having a work-supporting portion comprising a longitudinally extending member having a plurality of vertically-extending work supports, spaced-apart to leave an unobstructed space between them, and a transfer table having a work-supporting portion adapted to enter said space above said charging fork to deliver work to or receive work from said work supports.

9. In apparatus of the class described, a charging fork, work-supporting members carried by said fork having vertical portions adapted to support the work and disposed to leave an unobstructed space between said fork and the work, a transfer table having a cantilever portion adapted to enter said space, and means for raising and lowering said fork.

10. The method of charging an enameling furnace in which the work is supported upon horizontally spaced-apart, work-carrying members in vertically spaced-apart relation to the bottom of the furnace, which consists in supporting the work-carrying members in horizontally spaced-apart relation upon a charging fork; placing the work upon a cantilever support; moving the cantilever support into the space between the work-carrying members whereby the work upon it is directly over the work-carrying members on the charging fork; raising the charging fork thereby causing the work-carrying members to lift the work from the cantilever support; withdrawing the cantilever support from the path of movement of the charging fork; moving the charging fork, work-carrying members and work into the furnace; lowering the charging fork thereby depositing the work-carrying members with the work carried by them upon the supports therefor in the furnace; and withdrawing the fork from the furnace.

11. The method of unloading work from an enameling furnace in which the work is supported upon horizontally spaced-apart, work-carrying members in vertically spaced-apart relation to the bottom of the furnace which consists in inserting a charging fork into the space between the bottom of the furnace and the work-carrying members; raising the charging fork thereby transferring the work-carrying members with the work upon them from the supports therefor in the furnace to the fork; withdrawing the fork from the furnace into line with the path of movement of a cantilever work-support; moving the cantilever work-support into the vertical space between the top of the fork and the work; lowering the fork and work-carrying members thereby transferring the work to the cantilever support; and moving the cantilever support with the work upon it out of the path of movement of the fork and work-carrying members.

12. The method of unloading work from an enameling furnace charging fork on which the work is supported in vertically spaced-apart relation to said fork which consists of inserting a cantilever support into the space between the fork and the work, lowering the fork to transfer the work to the support and withdrawing the support with the work out of the path of the fork.

13. In a transfer table for loading and unloading enameling furnace charging forks, a supporting frame and a work supporting table top mounted on said supporting frame at one end thereof and extending over said supporting frame in vertically spaced-apart relation thereto in cantilever fashion.

14. In a transfer table for loading and unloading enameling furnace charging forks, a supporting frame and a work-supporting table top consisting of a plurality of spaced-apart bars mounted on said supporting frame at one end thereof and extending over said supporting frame in vertically spaced-apart relation thereto in cantilever fashion.

15. In apparatus for loading and unloading enameling furnaces, the combination of a charging fork adapted to be moved into and out of the furnace longitudinally thereof, means for raising and lowering said fork, removable, work-carrying members on said fork having upwardly extending portions adapted to support the work in vertically, spaced-apart relation to said fork, and a transfer table having an extended, work-supporting portion adapted to enter the vertical space between said fork and the work supported on said work-carrying members.

16. In apparatus of the class described, an enameling furnace, a charging fork, horizontally spaced-apart work-supports removably carried on said charging fork, a transfer table, truck supports in front of the furnace for said charging fork and said transfer table, said work-supports being adapted to support the work above said charging fork in vertically spaced-apart relation thereto, said transfer table having a cantilever extension adapted to enter the space between said charging fork and the work on said work-supports, and means for raising and lowering said charging fork to respectively transfer work from said cantilever extension to said work-supports or from said work-supports to said cantilever extension.

17. The method of loading work upon work-carrying members removably supported upon an enameling furnace charging fork upon which work-carrying members the work is supported in vertically spaced-apart relation to the charging fork, which consists in placing the work-carrying members in horizontally spaced-apart relation upon the charging fork; placing the work upon a cantilever work-support; moving the cantilever work-support into the horizontal space between the work-carrying members with the work directly above them; raising the charging fork with the work-carrying members upon it thereby lifting the work from the cantilever work-support; and withdrawing the cantilever work-support out of the path of movement of the charging fork and work-carrying members.

18. The method of loading work upon an enameling furnace charging fork on which the work is supported upon vertical, horizontally spaced-apart work-supports in vertically spaced-apart relation to the fork-sides which consists in placing the work upon a cantilever support; moving the cantilever support into the space between said work-supports whereby the work upon it is directly over the work-supports; raising the charging fork thereby causing the work-supports to lift the work from the cantilever support; and withdrawing the cantilever support out of the path of movement of the fork and its work-supports.

19. The method of loading and unloading an enameling furnace of the class described which consists in placing all of the unburned pieces comprising one charge of work simultaneously upon work-carrying members while they are outside of the furnace; placing said work-carrying members bearing said charge of unburned work in the furnace; permitting them to remain in the furnace during the burning operation; withdrawing the work-carrying members and work simultaneously from the furnace; immediately removing all of the pieces comprising said charge of work simultaneously from the work-carrying members; and immediately repeating the same cycle of operations with another charge of unburned work.

ROBERT A. WEAVER.
ARTHUR STOCKSTROM.